(12) United States Patent
Burrell et al.

(10) Patent No.: US 7,713,506 B2
(45) Date of Patent: May 11, 2010

(54) METAL AMINOBORANES

(75) Inventors: Anthony K. Burrell, Los Alamos, NM (US); Benjamin J. Davis, Los Alamos, NM (US); David L. Thorn, Los Alamos, NM (US); John C. Gordon, Los Alamos, NM (US); R. Thomas Baker, Los Alamos, NM (US); Troy Allen Semelsberger, Los Alamos, NM (US); William Tumas, Los Alamos, NM (US); Himashinie Vichalya Kaviraj Diyabalanage, Los Alamos, NM (US); Roshan P. Shrestha, Los Alamos, NM (US)

(73) Assignee: Los Alamos National Security, Los Alamos, NM (US)

( * ) Notice: Subject to any disclaimer, the term of this patent is extended or adjusted under 35 U.S.C. 154(b) by 0 days.

(21) Appl. No.: 12/151,575

(22) Filed: May 7, 2008

(65) Prior Publication Data

US 2008/0311017 A1    Dec. 18, 2008

Related U.S. Application Data

(60) Provisional application No. 60/928,718, filed on May 11, 2007.

(51) Int. Cl.
*C01B 35/00* (2006.01)
*C07F 5/02* (2006.01)
(52) U.S. Cl. .................. 423/287; 423/276; 423/284; 564/9
(58) Field of Classification Search ........... 423/287, 423/648.1; 564/9
See application file for complete search history.

(56) References Cited

U.S. PATENT DOCUMENTS

| | | | |
|---|---|---|---|
| 5,808,070 | A | 9/1998 | Noth et al. |
| 7,381,390 | B2 * | 6/2008 | Soloveichik et al. ........ 423/287 |
| 2007/0189950 | A1 * | 8/2007 | Thorn et al. ................ 423/285 |

OTHER PUBLICATIONS

Xiong et al., "High Capacity Hydrogen Storage in Lithium and Sodium Amidoboranes," Nature Materials, vol. 7 (Feb. 2008) pp. 138-141.
Ariafard et al., "Density Functional Theory Study on Structural Isomers and Bonding of Model Complexes $M(CO)_5(BH_3 * PH_3)$ (M=Cr, Mo, W) and $W(CO)_5(BH_3 * AH_3)$ (A=N, P, As, Sb)," Journal of Organometallic Chemistry, vol. 690 (Mar. 2005) pp. 1147-1156.
Myers et al., "Lithium Amidotrihydroborate, a Powerful New Reductant. Transformation of Tertiary Amides to Primary Alcohols." Tetrahedron Letters, vol. 37 (May 1996) pp. 3623-3626.
Pasumansky et al., "Recent Advances in the Chemistry of Lithium Aminoborohydrides," AldrichimicaACTA, vol. 38 (Jun. 2005) pp. 61-65.

* cited by examiner

*Primary Examiner*—Roy King
*Assistant Examiner*—Rebecca Lee
(74) *Attorney, Agent, or Firm*—Samuel L. Borkowsky

(57) ABSTRACT

Metal aminoboranes of the formula $M(NH_2BH_3)_n$ have been synthesized. Metal aminoboranes are hydrogen storage materials. Metal aminoboranes are also precursors for synthesizing other metal aminoboranes. Metal aminoboranes can be dehydrogenated to form hydrogen and a reaction product. The reaction product can react with hydrogen to form a hydrogen storage material. Metal aminoboranes can be included in a kit.

5 Claims, 3 Drawing Sheets

METAL AMINOBORANES

RELATED APPLICATIONS

This application claims the benefit of U.S. Provisional Patent Application Ser. No. 60/928,718 entitled "Metal Aminoboranes" filed May 11, 2007, incorporated by reference herein.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to metal aminoboranes.

BACKGROUND OF THE INVENTION

Hydrogen ($H_2$) is currently a leading candidate for a fuel to replace gasoline/diesel fuel in powering the nation's transportation fleet. There are a number of difficulties and technological barriers associated with hydrogen that must be solved in order to realize this "hydrogen economy". The problem of inadequate storage systems for on-board transportation hydrogen is recognized as a major technological barrier.

One of the general schemes for storing hydrogen relates to using a chemical compound or system that undergoes a chemical reaction to evolve hydrogen as a reaction product. In principle, a chemical storage system is attractive, but systems that have been developed to date involve either: (a) hydrolysis of high-energy inorganic compounds where the evolution of hydrogen is very exothermic (sodium borohydride/water as in the Millennium Cell's HYDROGEN ON DEMAND®, and lithium (or magnesium) hydride as in SAFE HYDROGEN®, for example), thus making the cost of preparing the inorganic compound(s) high and life-cycle efficiency low; or (b) dehydrogenation of inorganic hydride materials (such as $Na_3AlH_6/NaAlH_4$, for example) that release hydrogen when warmed but that typically have inadequate mass storage capacity and inadequate refueling rates.

Inorganic compounds referred to in (a), above, produce hydrogen according to the chemical reaction

$$MH_x + xH_2O \rightarrow M(OH)_x + xH_2 \quad (1)$$

where $MH_x$ is a metal hydride, and $M(OH)_x$ is a metal hydroxide. This reaction is irreversible.

Inorganic hydride materials referred to in (b), above, produce hydrogen according to the following chemical reaction

$$MH_x = M + x/2 H_2 \quad (2)$$

where $MH_x$ is a metal hydride, M is metal and $H_2$ is hydrogen gas. By contrast to the first reaction, which is irreversible with $H_2$, the second reaction is reversible with $H_2$.

A practical chemical system that evolves hydrogen yet does not suffer the aforementioned inadequacies would be important to the planned transportation sector of the hydrogen economy. This same practical chemical system would also be extremely valuable for non-transportation $H_2$ fuel cell systems, such as those employed in laptop computers and other portable electronic devices, and in small mechanical devices such as lawnmowers where current technology causes significant pollution concerns.

Any heat that must be input to evolve the hydrogen represents an energy loss at the point of use, and any heat that is evolved along with the hydrogen represents an energy loss where the chemical storage medium is regenerated. Either way, energy is lost, which diminishes the life-cycle efficiency. For most organic compounds, such as in those shown in equations 3-5 below, hydrogen evolution reactions are very endothermic, and the compounds are incompetent to evolve hydrogen at ambient temperature (i.e. thermodynamically incapable of evolving $H_2$ at significant pressure at ambient temperature).

$$CH_4 \rightarrow C + 2H_2 \quad (3)$$

$\Delta H^\circ = +18$ kcal/mol $\Delta G^\circ = +12$ kcal/mol

$$6CH_4 \rightarrow \text{cyclohexane} + 6H_2 \quad (4)$$

$\Delta H^\circ = +69$ kcal/mol $\Delta G^\circ = +78$ kcal/mol

$$\text{cyclohexane} \rightarrow \text{benzene} + 3H_2 \quad (5)$$

$\Delta H^\circ = +49$ kcal/mol $\Delta G^\circ = +23$ kcal/mol

For temperatures less than about 250-400 degrees Celsius, the equilibrium pressure of hydrogen over most organic compounds is very small. As a consequence, most-common organic compounds require heating above about 250 degrees Celsius, and the continual input of high-grade heat to maintain this temperature, in order to evolve hydrogen at a useful pressure.

Most organic compounds have hydrogen evolution reactions that are endergonic (i.e. having a net positive standard free energy of reaction change, i.e. $\Delta G^\circ > 0$) and their ambient temperature equilibrium hydrogen pressure is very low, practically unobservable. Thus, most organic compounds are unsuitable for hydrogen storage, based on both life-cycle energy efficiency and delivery pressure considerations.

Boranes have high hydrogen storage capacities and have attracted interest for use as hydrogen storage materials for transportation, but the difficulty of manufacturing borane compounds, and the life-cycle energy inefficiency of the chemical process presently used for their manufacture, has prevented their widespread use.

Sodium borohydride ($NaBH_4$) is a starting material typically used to prepare borane compounds such as diborane ($B_2H_6$), which is prepared by reacting $NaBH_4$ with $BF_3$. Borohydride compounds (i.e. compounds containing the $BH_4$ anion or other anionic B—H groups) are generally prepared by reacting alkoxyborates with active metal hydrides e.g. NaH or $NaAlH_4$. Sodium borohydride itself ($NaBH_4$), for example, is commercially prepared using the known Schlessinger process, which involves reacting sodium hydride (NaH) with trimethoxyboron ($B(OCH_3)_3$). While convenient to practice on a small or intermediate laboratory or commercial scale, these reactions are not energy-efficient; the reaction of NaH with $B(OCH_3)_3$ is exothermic, and NaH is itself formed in the exothermic reaction of Na metal with $H_2$, so overall, about 22 kcal of heat are released per B—H bond that is formed.

Ammonia borane ($NH_3BH_3$) is an attractive material for hydrogen storage. It is a solid, has a relatively low molecular weight and a very high hydrogen storage capacity of 19.6 percent by weight. Ammonia borane spontaneously releases a molecule of molecular hydrogen ($H_2$) at temperatures above about 90 degrees Celsius. Ammonia borane can be dehydrogenated completely to form ceramic boron nitride (BN), but temperatures in excess of 500 degrees Celsius are required. Thus, while ammonia borane has a high molecular hydrogen storage capacity, only ⅔ of the stored hydrogen is readily accessible and the product after release of hydrogen is chemically difficult to hydrogenate.

SUMMARY OF THE INVENTION

In accordance with the purposes of the present invention, as embodied and broadly described herein, the present invention includes a method for preparing composition of the formula $$M(NH_2BH_3)_n$$

wherein the method involves reacting a metal halide with a precursor alkali metal aminoborane for the formula $M'(NH_2BH_3)_n$.

The invention also includes a kit comprising a metal halide and an alkali metal aminoborane and a set of instructions that describe synthesizing a composition of the formula $M(NH_2BH_3)_n$ using said metal hydride and said alkali metal aminoborane.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

An aspect of the invention is concerned with materials that store and release hydrogen. Embodiment hydrogen storage materials of the invention are known herein as metal aminoboranes. Metal aminoboranes are typically molecular compounds where the metal is bonded to the nitrogen of the aminoborane ($NH_2BH_3$) group. Metal aminoboranes are materials of the formula $$M(NH_2BH_3)_n$$

wherein M is a metal and n is from 1 to 6. A material of this formula is referred to herein as a metal aminoborane. M can be a single metal such as sodium (Na), calcium (Ca), aluminum (Al), and titanium (Ti). M can also represent more than one metal (NaBa, KAl, for example). Examples of metals include at least one of Li, Be, Na, Mg, Al, Si, P, K, Ca, Sr, Ba, Rb, Cs, transition metals (Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg), main group elements (B, C, N, Al, Si, P, S, Ga, Ge, As, Se, In, Sn, Sb, Te, Tl, Pb, Bi) and lanthanides (Ce, Pr, Nd, Pm, Sm, Eu, Gd, Tb, Dy, Ho, Er, Tm, Yb).

Figure 1:
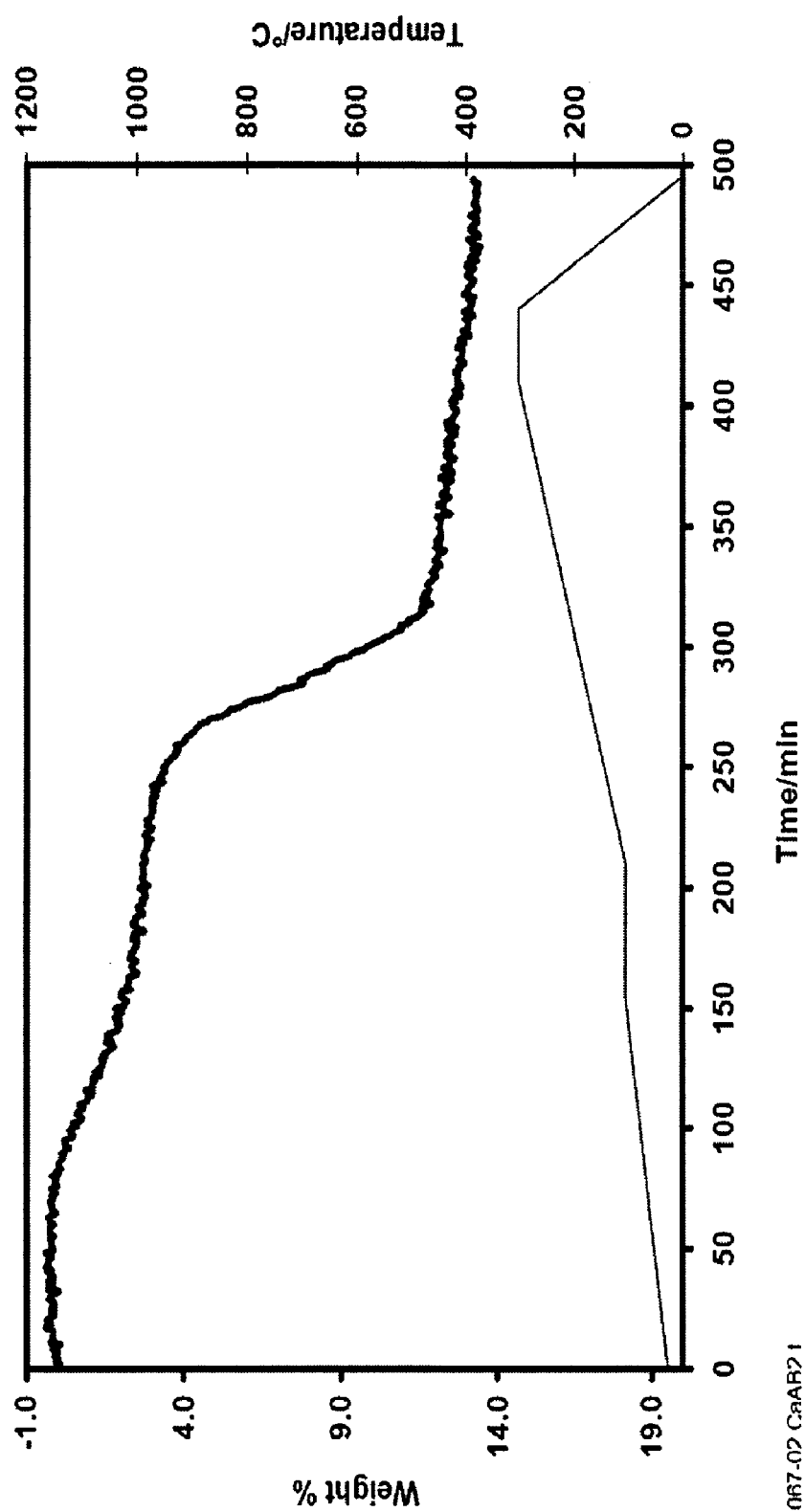
FIG. 1 shows a graph of the thermal gravimetric analysis (TGA) of $Ca(NH_2BH_3)_2$. The mass loss for the $Ca(NH_2BH_3)_2$ shows the greatest change above 180 degrees Celsius. The temperature profile for this TGA is shown as the lower line.

Embodiment metal aminoboranes can release their stored hydrogen quickly. After releasing the hydrogen, the hydrogen-depleted product can be converted back into the original composition using hydrogen pressure. Some embodiment metal aminoboranes have theoretical hydrogen storage capacities of greater than 6 percent by weight. The thermal gravimetric analysis of $Ca(NH_2BH_3)_2$ is shown in FIG. 1, which is a graph of weight percent versus time in minutes. FIG. 1 clearly shows a significant loss of mass from $Ca(NH_2BH_3)_2$ as the material is heated from room temperature to a temperature of 200 degrees Celsius.

The properties of metal aminoboranes are different from those of ammonia borane ($NH_3BH_3$). Ammonia borane foams at a temperature of 90 degrees Celsius. Calcium aminoborane, on the other hand, does not foam. In addition, metal aminoboranes such as calcium aminoborane can release their hydrogen over a wider temperature range than ammonia borane does. The temperature range for hydrogen release in ammonia borane is 105 degrees Celsius to 180 degrees Celsius, whereas $Ca(NH_2BH_3)_2$ releases hydrogen from 100 degrees Celsius to 240 degrees Celsius.

Metal aminoboranes can be used as precursors for synthesizing other metal aminoboranes. A general reaction describing the synthesis of a metal aminoborane using a precursor metal aminoborane is summarized by the equation $$MX_n + nM'(NH_2BH_3)_y \rightarrow M(NH_2BH_3)_y + nM'X \quad (10)$$

where $MX_n$ is a precursor metal halide, $M'(NH_2BH_3)_y$ is a precursor alkali metal aminoborane, $M(NH_2BH_3)_y$ is a product metal aminoborane, M'X is a product alkali metal halide, and y is 1 to 6. Some non-limiting embodiment precursor alkali metal aminoboranes include lithium aminoborane, sodium aminoborane and potassium aminoborane. In an embodiment synthesis, which is summarized by equation (11), magnesium aminoborane ($Mg(NH_2BH_3)_2$) is synthesized by reacting magnesium chloride with sodium aminoborane:

$$MgCl_2 + 2NaNH_2BH_3 \rightarrow Mg(NH_2BH_3)_2 + 2NaCl. \quad (11)$$

Another aspect of the invention is concerned with kits that include metal aminoborane, and also with kits for making metal aminoborane. An embodiment kit includes a metal aminoborane (sodium aminoborane, calcium aminoborane, for example) and a set of instructions for using the metal aminoborane. The metal aminoborane can be in the form of a solid. The metal aminoborane can also be in the form of a solution. The kit could include more than one type of metal aminoborane. A second embodiment kit includes a metal hydride, ammonia borane, and a set of instructions for synthesizing a metal aminoborane using the metal hydride and ammonia borane. The second embodiment kit can include a particular metal hydride (sodium hydride for making sodium aminoborane, calcium hydride for making calcium aminoborane, for example). The metal hydride can be in the form of a solid. The metal hydride can also be in the form of a solution. The second embodiment kit can include more than one type of metal hydride. Depending on the desired metal aminoborane, a kit would include the appropriate metal hydride. A third embodiment kit includes a metal halide, a precursor alkali metal aminoborane, and a set of instructions for synthesizing a metal aminoborane using the metal halide and precursor alkali metal aminoborane. Depending on the desired metal aminoborane, a kit would include the appropriate metal halide (titanium chloride for making titanium aminoborane, for example). Embodiment kits can optionally include solvents for preparing solutions (of metal hydride, for example), measuring devices for measuring an amount of a chemical or solution, reaction vessels for containing a chemical or solution or mixture, thermometer, and stirring apparatus.

Figure 2:
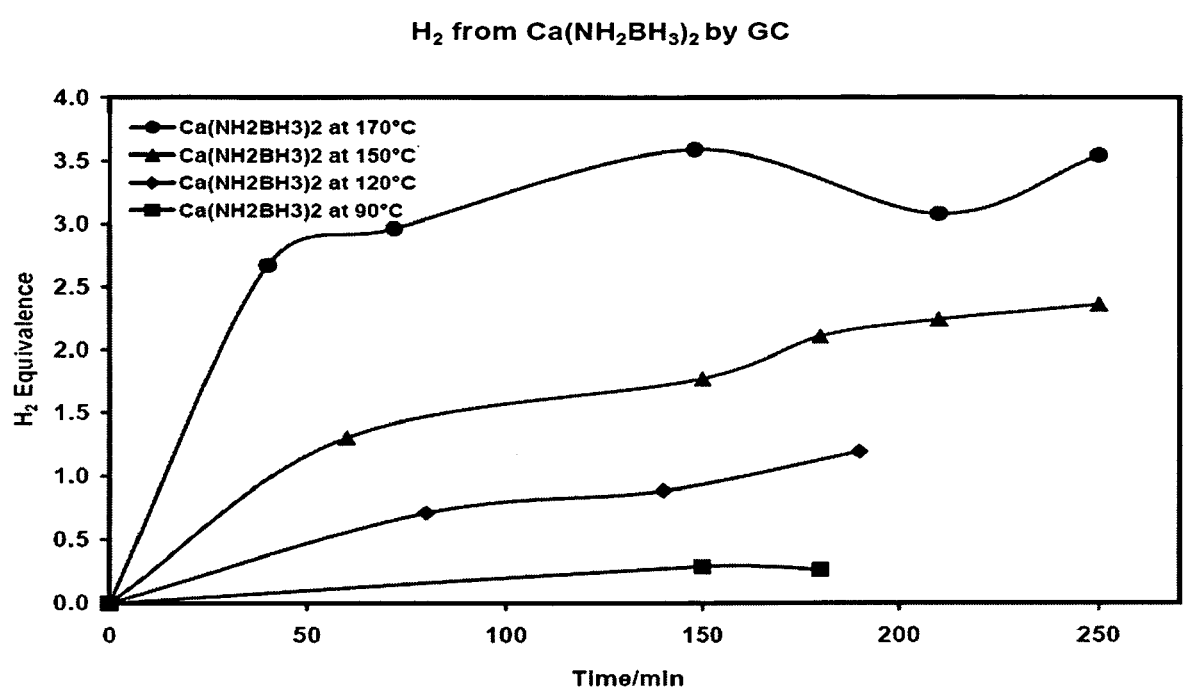
FIG. 2 shows hydrogen evolution curves for $Ca(NH_2BH_3)_2$ at 90, 120, 150 and 170 degrees Celsius. Hydrogen loss is recorded using a calibrated gas chromatograph.

Hydrogen release can be achieved using a number of different approaches. Some non-limiting examples of approaches include thermal treatment, treatment using homogeneous catalysts, and treatment using heterogeneous catalysts. FIG. 2 shows four hydrogen evolution curves for $Ca(NH_2BH_3)_2$ at temperatures of 90, 120, 150, and 170 degrees Celsius as measured by gas chromatography.

Figure 3:
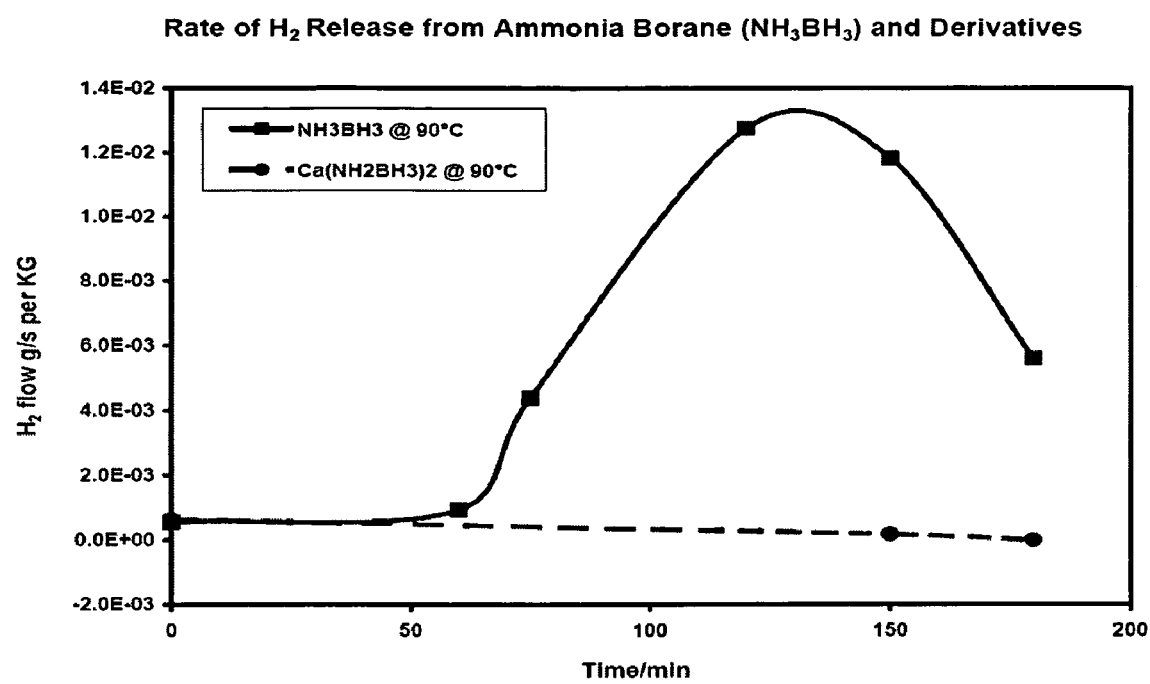
FIG. 3 shows a comparison of the thermal stability of $Ca(NH_2BH_3)_2$ and $NH_3BH_3$ at 90 degrees Celsius as measured by gas chromatography.

Some embodiment metal aminoborane compounds of the invention will not react significantly in an air environment, or undergo spontaneous hydrogen release. FIG. 3 shows a comparison of the thermal stability of $Ca(NH_2BH_3)_2$ with that of $NH_3BH_3$ by measuring an isothermal release of hydrogen from these compounds at a temperature of 90 degrees Celsius. The measurements were made using gas chromatography. The dotted line is for $Ca(NH_2BH_3)_2$, which shows a small loss of hydrogen at a temperature of 90 degrees Celsius. No further hydrogen release is observed after this temperature. The solid line is for $NH_3BH_3$, which shows a significant loss of hydrogen after 70 minutes. These compounds can be used with a wider range of catalysts, and the use of such systems adds to the overall safety of any hydrogen storage system.

In an embodiment, a metal aminoborane of the formula $$M(NH_2BH_3)_n$$

wherein M comprises a metal and wherein n is from 1 to 6 is prepared by preparing a mixture of metal hydride with ammonia borane and then ball-milling the mixture until the metal aminoborane is produced.

The properties of the metal aminoboranes could be changed by the functionalization of the nitrogen with alkyl groups such as methyl, to give compounds of the form $M(NH(CH_3)BH_3)_2$. These compounds will have different properties due to the changes in the steric and electronic properties of the of the aminoborane ligand. These different properties may include more effective hydrogen release or uptake in the dehydrogenated produce, the formation of liquid phases or improved inherent stability in the metal aminoboranes.

The following non-limiting EXAMPLES describe the synthesis of some metal aminoboranes. In these EXAMPLES, the synthesis was performed under an atmosphere of argon or nitrogen in a glove box and/or using standard Schlenk techniques for manipulating materials that may be sensitive to air and/or moisture.

EXAMPLE 1

Synthesis of calcium aminoborane ($Ca(NH_2BH_3)_2$). A solution of ammonia borane ($NH_3BH_3$, 0.20 grams, 6.48 millimoles) in tetrahydrofuran (30 milliliters) was prepared. The solution was slowly added at room temperature to a suspension of calcium hydride (0.14 grams, 3.24 millimoles) in tetrahydrofuran (20 milliliters). The resulting suspension was allowed to stir overnight at room temperature. The solvent was removed under vacuum to yield a white solid product of the formula $Ca(NH_2BH_3)_2$. Yield: 0.31 grams, 96%.

EXAMPLE 2

Synthesis of magnesium aminoborane ($Mg(NH_2BH_3)_2$). Sodium aminoborane ($NaNH_2BH_3$, 0.20 grams, 3.78 millimoles) and magnesium chloride (0.18 milligrams, 1.89 millimoles) were mixed in tetrahydrofuran (20 milliliters) and the mixture was allowed to stir at room temperature overnight. The removal of the volatiles under vacuum afforded crude $Mg(NH_2BH_3)_2$ (Yield: 0.15 milligrams, 95%).

EXAMPLE 3

Synthesis of $Mg(NH_2BH_3)Cl$. Sodium aminoborane (0.20 grams, 3.78 millimoles) were mixed in tetrahydrofuran (20.0 milliliters) and the mixture was allowed to stir overnight at room temperature. The removal of the volatiles under vacuum afforded crude $Mg(NH_2BH_3)Cl$ (Yield: 0.31 milligrams, 90%).

EXAMPLE 4

Synthesis of titanium aminoborane ($Ti(NH_2BH_3)_4$). A solution of titanium chloride (0.20 milliliter, 0.95 millimoles) in tetrahydrofuran was added dropwise to a solution of sodium aminoborane (0.20 grams, 3.78 millimoles) in tetrahydrofuran (30 milliliters). The resulting mixture was allowed to stir at room temperature overnight. The removal of the volatiles under vacuum afforded crude $Ti(NH_2BH_3)_4$.

EXAMPLE 5

Synthesis of Synthesis of titanium aminoborane ($Ti(NH_2BH_3)_4$). A solution of titanium tetrachloride (0.30 milliliters, 2.72 millimoles) was added dropwise to a solution of lithium aminoborane (0.40 grams, 10.9 millimoles) in toluene (30 milliliters). The resulting mixture was allowed to stir at room temperature for 2 hours. The removal of the volatiles under vacuum afforded yellow crude $Ti(NH_2BH_3)_4$ (Yield: 0.40 grams, 88%).

EXAMPLE 6

Synthesis of Lithium aluminum aminoborane ($LiAl(NH_2BH_3)_4$). A solution of ammonia borane (0.20 grams, 6.48 millimoles) in tetrahydrofuran (20 milliliters) was prepared and cooled to a temperature of 0 degrees Celsius. A solution of lithium aluminum hydride (1.08 milliliters, 2.16 millimoles) was added dropwise to the cold ammonia borane solution over a period of 30 minutes. The reaction mixture was stirred for an additional hour, and then was allowed to warm gradually to room temperature. The removal of the volatiles under vacuum afforded crude $LiAl(NH_2BH_3)_4$.

EXAMPLE 7

Synthesis of vanadium aminoborane ($V(NH_2BH_3)_2$). A mixture of sodium aminoborane (0.10 grams, 1.89 millimoles) and vanadium (II) chloride in tetrahydrofuran (20 milliliters) was prepared and allowed to stir at room temperature overnight. The removal of solvent under vacuum afforded crude $V(NH_2BH_3)_2$ (Yield: 0.09 milligrams, 90%).

EXAMPLE 8

Synthesis of scandium aminoborane ($Sc(NH_2BH_3)_2$). A solution of lithium aminoborane (0.10 grams, 2.72 millimoles) in tetrahydrofuran (30 milliliters) was prepared. Scandium (III) trifluoromethanesulfonate (0.45 grams, 0.91 millimoles) was added to the solution and the resulting mixture was allowed to stir at room temperature overnight. The removal of the volatiles under vacuum afforded crude $Sc(NH_2BH_3)_2$ (Yield: 0.11 grams, 90%).

EXAMPLE 9

Synthesis of $Li_2[Zn(NH_2BH_3)_4]$. Aminoborane (0.25 grams, 8.0 millimoles) and lithium tetrahydrozincate (0.17 grams, 2.0 millimoles) were mixed in tetrahydrofuran and allowed to react at room temperature for 15 minutes. The mixture was filtered through Celite and volatiles were removed from the filtrate under a vacuum to afford crude $Li_2[Zn(NH_2BH_3)_4]$ (Yield: 0.39 grams, 98%).

EXAMPLE 10

Synthesis of $LiZn(NH_2BH_3)_3$. Aminoborane (0.19 grams, 6.0 millimoles) and lithium tetrahydrozincate (0.15 grams, 2.0 millimoles) were mixed in tetrahydrofuran and allowed to react at room temperature for 15 minutes. The mixture was filtered through Celite and volatiles were removed from the filtrate under a vacuum to afford crude $LiZn(NH_2BH_3)_3$ (Yield: 0.31 grams, 96%).

EXAMPLE 11

Release of hydrogen ($H_2$) from $Ca(NH_2BH_3)_2$. In a hypothetical example, a solution of $Ca(NH_3BH_3)_2$ in tetrahydrofuran (THF) is prepared. A catalyst of the formula $((C_6H_5)_3P)_4RuH_2$ is added to the solution, and the solution is heated at a temperature of 50 degrees Celsius. A reaction product is formed as hydrogen ($H_2$) is released from the $Ca(NH_3BH_3)_2$.

EXAMPLE 12

Release of hydrogen ($H_2$) from $Ca(NH_2BH_3)_2$. In a hypothetical example, a solution of $Ca(NH_3BH_3)_2$ in tetrahydrofuran (THF) is prepared. A Rhodium on alumina catalyst is added, and the resulting mixture is heated at a temperature of 50 degrees Celsius. A reaction product is formed as hydrogen ($H_2$) is released from the $Ca(NH_3BH_3)_2$.

EXAMPLE 13

In a hypothetical example, the reaction product of EXAMPLE 6 is heated under a hydrogen atmosphere to a temperature sufficient for forming a hydrogen storage material.

EXAMPLE 14

In a hypothetical example, the reaction product of EXAMPLE 7 is heated under hydrogen atmosphere to a temperature sufficient for forming a hydrogen storage material.

EXAMPLE 15

Synthesis of tungsten hexaaminoborane ($W(NH_2BH_3)_6$). In a hypothetical example, a solution of sodium aminoborane ($NaNH_2BH_3$) in tetrahydrofuran is prepared and cooled to a temperature of 0 degrees Celsius. A solution of tungsten hexachloride ($WCl_6$) is added dropwise to the cold sodium aminoborane solution over a period of 30 minutes. The reaction mixture is stirred for an additional hour, and then is allowed to warm gradually to room temperature. The solution is filtered and the product $W(NH_2BH_3)_6$ is isolated.

EXAMPLE 16

Synthesis of zinc aminoborane ($Zn(NH_2BH_3)_2$). A solution of ammonia borane in tetrahydrofuran was prepared and cooled to a temperature of 0 degrees Celsius. A solution of diethylzinc (($CH_3CH_2)_2Zn$) was added dropwise to the cold ammonia borane solution over a period of 30 minutes. The reaction mixture was stirred for an additional hour, and then was allowed to warm gradually to room temperature. The solution was filtered to give a product of the formula $Zn(NH_2BH_3)_2$, which was isolated.

In summary, metal aminoboranes have been synthesized. These materials can be used for storing hydrogen. In at least some cases the metal amine boranes can be used as starting materials for the synthesis of other metal amine boranes. Spent metal aminoboranes can be regenerated using hydrogen pressure, and the regenerated material redistributed for use as a fuel. The regenerated product may be of the same formula as the original metal aminoborane. The invention may enable widespread use of metal aminoboranes for hydrogen storage for transportation.

The foregoing description of the invention has been presented for purposes of illustration and description and is not intended to be exhaustive or to limit the invention to the precise form disclosed, and obviously many modifications and variations are possible in light of the above teaching. For example, while tetrahydrofuran was disclosed as a solvent for making metal aminoboranes, it should be understood to one skilled in the art that other solvents besides tetrahydrofuran could also be used as long as they dissolve a desired material and do not interfere with the synthesis of a metal aminoborane. One skilled in the art would also appreciate that while only a few non-limiting metal aminoboranes were disclosed, many others could also be synthesized depending on the starting metal hydride (for the synthesis of metal aminoboranes using a metal hydride and ammonia borane) and on the starting metal halide (for the synthesis of metal aminoboranes using a metal halide).

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for preparing composition of the formula $M(NH_2BH_3)_n$ comprising, reacting a metal halide with a precursor alkali metal aminoborane of the formula $M'(NH_2BH_3)_n$, wherein n is from 1 to 6, wherein M' is chosen from alkali metals, and wherein M is chosen from alkali metals, alkaline earth metals, transition metals, and Group IIIA metals.

2. The method of claim 1, wherein said metal M comprises Li, Be, B, C, N, Na, Mg, Al, Si, P, S, Ar, K, Ca, Sc, Ti, V, Cr, Mn, Fe, Co, Ni, Cu, Zn, Ga, Ge, As, Se, Y, Zr, Nb, Mo, Ag, Cd, In, Sn, or combinations thereof.

3. The method of claim 1, wherein M' is chosen from lithium, sodium or potassium.

4. The method of claim 1, further comprising isolating the metal aminoborane composition.

5. The method of claim 1, wherein the metal halide is chosen from a metal fluoride, a metal chloride, a metal bromide, a metal iodide, a mixed-metal halide, a metal mixed halide, a metal triflate, and combinations thereof.

* * * * *